May 31, 1960 F. W. LIVERMONT Re. 24,831
DETACHABLE WRENCH HEAD CONSTRUCTION
Original Filed July 30, 1956 2 Sheets-Sheet 1
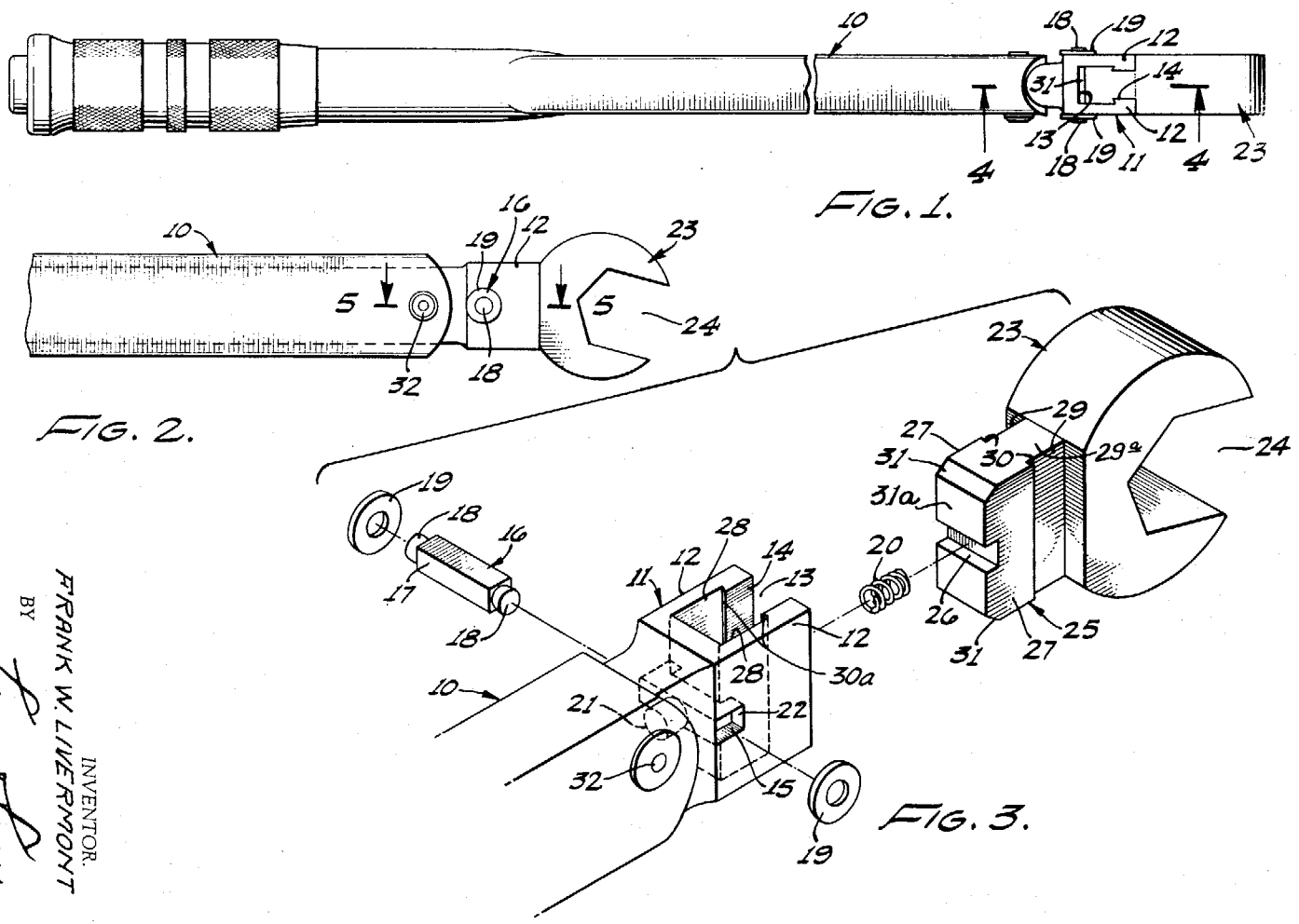
INVENTOR.
FRANK W. LIVERMONT
BY
Lyon & Lyon
ATTORNEYS

DETACHABLE WRENCH HEAD CONSTRUCTION

Original Filed July 30, 1956 2 Sheets-Sheet 2

INVENTOR.
FRANK W. LIVERMONT
BY
Lyon & Lyon
ATTORNEYS

United States Patent Office

Re. 24,831
Reissued May 31, 1960

24,831

DETACHABLE WRENCH HEAD CONSTRUCTION

Frank W. Livermont, Duarte, Calif.
(922 S. Myrtle Ave., Monrovia, Calif.)

Original No. 2,832,246, dated Apr. 29, 1958, Ser. No. 601,035, July 30, 1956. Application for reissue July 24, 1959, Ser. No. 829,477

3 Claims. (Cl. 81—177)

Matter enclosed in heavy brackets [ ] appears in the original patent but forms no part of this reissue specification; matter printed in italics indicates the additions made by reissue.

This invention relates to torque wrenches of the general type shown in my Patent No. 2,732,747 and is particularly directed to an improved mounting connection so that any one of a plurality of interchangeable heads may be used.

An important object of my invention is to provide a novel form of releasable connection between the work engaging head and the other parts of the torque wrench assembly, so that the center of the head, regardless of size or type is always located at the same distance from the fulcrum point of the torque wrench. In this way, the setting of the calibrated handle can be used without modification and without resorting to conversion tables for various types of heads. Another object is to provide such a device in which the work engaging heads can be snapped into place for either right hand or left hand torque application. Another object is to provide a novel form of releasable locking connection which is massive and rugged enough to resist load forces applied and yet which permits instant release or assembly of the parts. Another object is to provide such a connection which is positively locked and which is substantially free from lost motion and looseness in either direction. Other objects and advantages will appear hereinafter.

In the drawings:

Figure 1 is a top view of a torque wrench embodying my invention.

Figure 2 is a side elevation of a portion thereof.

Figure 3 is an exploded view showing the manner of assembly of the various parts.

Figure 4:
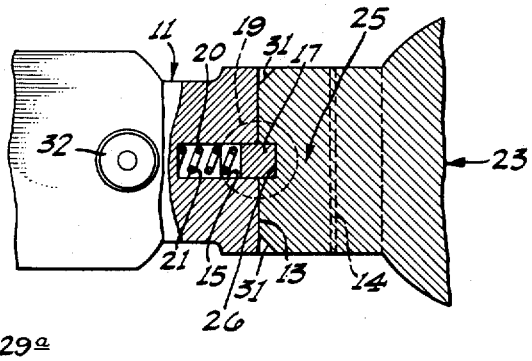
Figure 4 is a sectional elevation taken substantially on the lines 4—4 as shown in Figure 1.
Figure 5:
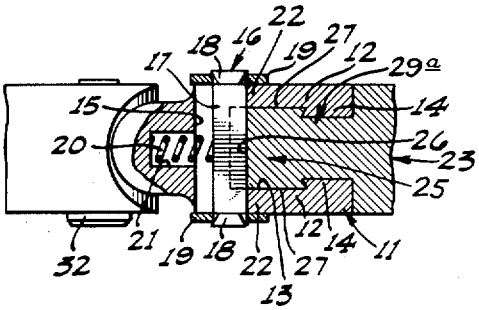
Figure 5 is a sectional plan view taken substantially on the lines 5—5 as shown in Figure 2.

Referring to the drawings, the torque wrench assembly generally designated 10 may be constructed in a manner similar to that shown in my Patent 2,732,747, except that the forward end of the wrench assembly comprises a support member having parallel side arms 12 defining a slot 13 between them. The outer ends of the arms 12 are provided with parallel ribs 14 which are inwardly directed. A transverse opening 15 extends through the support member 11 and this opening 15 intersects the slot 13. A latch pin 16 having a square central portion 17 and circular end portions 18 extends through the opening 15. Retainer rings 19 are press fitted or otherwise attached to the circular portions 18 of the pin 16. These retainer rings 19 lie adjacent the outer surfaces of the arms 12 and have sliding clearance therewith. A coil spring 20 is received within a recess 21 and acts against the central portion of the pin 16 to move it forwardly toward the slot 13. The pin 16 slides axially within the oblong opening 15 and contacts the shoulders 22.

The support member 11 is adapted to receive any one of a plurality of work engaging heads. The head 23 as shown in Figures 1–3 is provided with end wrench opening 24. The head 23 is provided with a block 25 which is insertable into the slot 13 in the member 11. The block 25 has a transverse groove 26 adapted to receive the latch pin 16. The surfaces 27 on the block 25 have a close sliding fit with the surfaces 28 on the support member 11, and similarly the surfaces 29 have a close sliding fit with the inner surfaces of the ribs 14. [Undercut dovetail surfaces 30 are provided on both the support member 11 and the block 25.] *Undercut inclined shoulders 30 are provided on the block 25 at the junction between the block 25 and the neck 29a, and cooperating inclined undercut abutments 30a are provided on the parallel arms 11 at the ends of the ribs 14 for sliding contact with the shoulders 30. The ribs 14 each extend inward for a short distance as compared to the thickness of the neck 29a between the surfaces 29, and the head 25 is only slightly wider than the neck 29a. The projecting end of the block 25 is defined by the end surface 31a.*

The head 23 is placed in position on the support member 11 by sliding the block 25 into the wide portion of the slot 13 between the surfaces 28. One of the beveled edges 31 strikes a corner of the square portion 17 of the latching pin 16 and moves it rearwardly against the action of the spring 20. When the groove 26 reaches a position of alignment with the oblong opening 15 the spring 20 moves the pin 16 into the groove 26 to lock the head 23 against movement on the support member 11.

The parts fit closely so that there is substantially no lost motion and no looseness is present when they are assembled. The square latch pin 16 positively locks the parts 11 and 23 against movement. *Since the parallel arms 12 are not confined at their projecting ends against relative lateral spreading movement, the application of bolt-tightening torque loads from the handle on the wrench head would result in lateral spreading of the ends of the arms but this action is prevented by the inclined undercut shoulders 30 and abutments 30a.*

The head 23 may be installed by moving the block 25 through either end of the slot 13, and furthermore, the head may be installed in an inverted position, if desired. In this way, the device may be used for applying torque for either right hand or left hand threaded fittings. The head 23 is removed from the support member 11 by grasping the retainer rings 19 between thumb and forefinger and moving the pin 16 rearwardly against the action of the spring 20. When the pin 16 has moved out of the groove 26 the block 25 may be moved in either direction with respect to the member 11. The torque setting of the wrench assembly remains correct because inverting the head 23 does not change the axial distance from the wrench socket 24 to the fulcrum pin 32.

Figure 6:
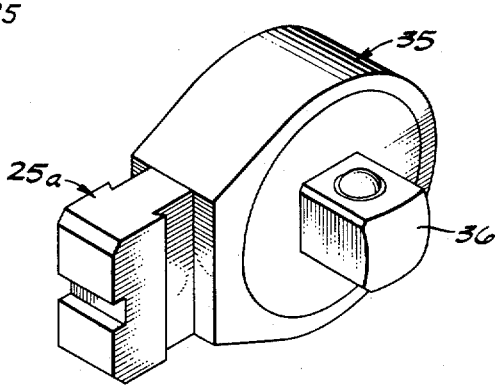
Figure 6 shows a modified form of work contacting head.

The head 35 shown in Figure 6 has a laterally projecting square driver 36 which is connected with an internal ratchet mechanism of conventional type (not shown). The block 25a is substantially the same as the block 25 previously described, so that the head 35 may be substituted for the head 23 when desired. Since the transverse axis of the square driver 36 is located at the same spacing from the head 25a as the effective center of the wrench opening 24, the torque adjustment within the device 10 gives the correct reading and action for the head 35 as well as for the head 23. The head 35 may likewise be inverted with respect to the member 11 and in this way the ratchet action may be changed from a right hand drive to a left hand drive, as desired.

Figure 7:
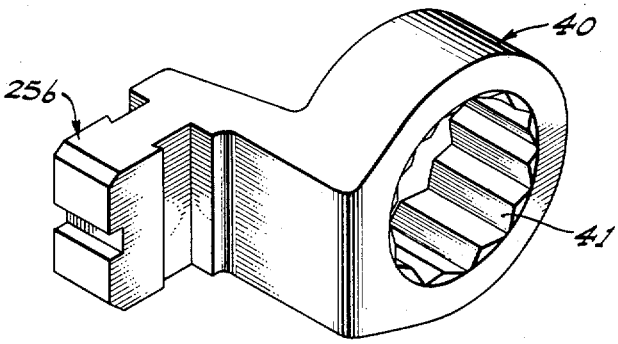
Figure 7 shows a further modification.

The offset box head 40 as shown in Figure 7, has a box wrench opening 41 which is laterally offset from the head 25b. The head 25b is substantially the same in all respects as the head 25 previously described. The distance from the axis of the box head opening 41 to the block 25b is the same as the corresponding distance on the head 23 so that no change need be made in the setting of the torque value on the wrench assembly 10. The head 40 may be installed in an inverted position, if desired, and this makes it possible to use the advantages of the offset feature for applying the torque to either a right hand or left hand threaded element.

Having fully described my invention, it is to be understood that I do not wish to be limited to the details herein set forth, but my invention is of the full scope of the appended claims.

I claim:

1. In a torque wrench assembly, the combination of: a support member having a transverse slot, a wrench head having a block movable into the slot from either end thereof, the block being symmetrical to permit insertion into the slot in either upright or inverted position, latch means for retaining the block within the slot, said latch means including an opening extending centrally through the support member at right angles to the slot and intersecting the slot, a non-circular latch pin movable in the opening toward and away from the slot, the ends of the latch pin projecting beyond the sides of the support member for manual actuation, a spring acting on the latch pin to move it toward the slot, and a central groove in the block adapted to receive the latch pin.

2. *In a wrench assembly having a wrench head member detachably connected to a handle member, the combination of: a neck on one member having a block at the projecting end of the neck, the neck and the block each having parallel side surfaces respectively, the block being wider than the neck, the projecting end of the block comprising an end surface, a pair of inclined undercut shoulders symmetrically positioned at the junction of said neck and said block in spaced relation from said*

*end surface, said inclined undercut shoulders diverging away from said end surface, a pair of arms on the other member, each arm having an inwardly directed rib adjacent the projecting end of the arm, inclined undercut abutments on said arms at the inner ends of said ribs slidably engaging said inclined undercut shoulders, respectively, the arms slidably engaging the side surfaces of said block and the ribs slidably engaging the side surfaces of said neck, the lateral width of said neck being substantially greater than that of said inclined undercut shoulders and abutments, the arms being unconfined at their projecting ends and being capable of lateral spreading movement, the said inclined undercut shoulders and abutments cooperating to prevent spreading of the projecting ends of the arms upon application of bolt-tightening torque loads from the handle member to the wrench head member, and releasable means for securing said members in assembled relationship.*

3. *The combination set forth in claim 2 in which the neck and block are provided on the wrench head member, and the arms and ribs are provided on the handle member.*

References Cited in the file of this patent or the original patent

UNITED STATES PATENTS

| | | |
|---|---|---|
| 1,303,090 | McCray | May 6, 1919 |
| 1,784,683 | Schweigert | Dec. 9, 1930 |
| 1,807,347 | Schweigert | May 26, 1931 |
| 2,755,115 | Kollmann | July 17, 1956 |
| 2,832,246 | Livermont | Apr. 29, 1958 |

FOREIGN PATENTS

| | | |
|---|---|---|
| 132,745 | Sweden | Aug. 21, 1951 |
| 333,405 | Great Britain | Aug. 14, 1930 |
| 344,092 | France | Aug. 25, 1904 |
| 416,138 | Great Britain | Sept. 13, 1934 |
| 1,019,131 | France | Oct. 22, 1952 |